(12) United States Patent
Herslow et al.

(10) Patent No.: US 10,089,570 B2
(45) Date of Patent: *Oct. 2, 2018

(54) CARD WITH METAL LAYER AND AN ANTENNA

(71) Applicant: COMPOSECURE, LLC, Somerset, NJ (US)

(72) Inventors: John Herslow, Bridgewater, NJ (US); Michele Logan, Madison, NJ (US); David Finn, Tourmakeady (IE)

(73) Assignee: COMPOSECURE, LLC, Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,939

(22) Filed: Jul. 5, 2017

(65) Prior Publication Data
US 2017/0300800 A1    Oct. 19, 2017

Related U.S. Application Data

(63) Continuation of application No. 14/543,495, filed on Nov. 17, 2014, now Pat. No. 9,721,200.

(Continued)

(51) Int. Cl.
*G06K 19/06*    (2006.01)
*G06K 19/077*   (2006.01)
(Continued)

(52) U.S. Cl.
CPC ......... *G06K 19/07722* (2013.01); *G01B 7/06* (2013.01); *G06K 19/07783* (2013.01); *H01Q 1/2225* (2013.01); *H01Q 1/38* (2013.01); *H01Q 7/00* (2013.01); *H05K 999/99* (2013.01); *Y10T 29/49016* (2015.01)

(58) Field of Classification Search
CPC ............. G06K 19/077; G06K 19/0772; G06K 19/07722; G06K 19/07749; G06K 19/07783; H01Q 1/2225; G01B 7/06
See application file for complete search history.

(56) References Cited

U.S. PATENT DOCUMENTS

| | | | |
|---|---|---|---|
| 5,892,661 | A | 4/1999 | Stafford et al. |
| 6,394,346 | B1 | 5/2002 | Bonneau et al. |

(Continued)

FOREIGN PATENT DOCUMENTS

CN    102549841 A    7/2012

OTHER PUBLICATIONS

International Search Report and Written Opinion of the International Search Authority for International Application No. PCT/US2014/065986, 8 pages.

(Continued)

*Primary Examiner* — Thien M Le
*Assistant Examiner* — April Taylor
(74) *Attorney, Agent, or Firm* — RatnerPrestia

(57) ABSTRACT

In a smart card having an antenna structure and a metal layer, an insulator layer is formed between the antenna structure and the metal layer to compensate for the attenuation due to the metal layer. The thickness of the insulator layer affects the capacitive coupling between the antenna structure and the metal layer and is selected to have a value which optimizes the transmission/reception of signals between the card and a card reader.

20 Claims, 7 Drawing Sheets

Related U.S. Application Data

(60) Provisional application No. 61/962,873, filed on Nov. 18, 2013.

(51) Int. Cl.
*G01B 7/06* (2006.01)
*H01Q 1/38* (2006.01)
*H01Q 1/22* (2006.01)
*H01Q 7/00* (2006.01)

(56) References Cited

U.S. PATENT DOCUMENTS

| | | | |
|---|---|---|---|
| 6,618,024 B1 * | 9/2003 | Adair | G06K 19/07749 |
| | | | 235/451 |
| 6,644,552 B1 | 11/2003 | Herslow | |
| 6,853,286 B2 * | 2/2005 | Nikawa | G06K 19/0726 |
| | | | 29/602.1 |
| 7,287,704 B2 | 10/2007 | Herslow | |
| 8,159,405 B2 * | 4/2012 | Kimura | H01Q 1/2208 |
| | | | 343/788 |
| 8,356,757 B2 | 1/2013 | Sonoda et al. | |
| 8,393,547 B2 * | 3/2013 | Kiekhaefer | G06K 19/07722 |
| | | | 235/487 |
| 8,672,232 B2 | 3/2014 | Herslow | |
| 8,752,277 B2 | 6/2014 | Orihara et al. | |
| 8,944,810 B2 | 2/2015 | Herslow | |
| 9,016,591 B2 | 4/2015 | Herslow et al. | |
| 9,300,251 B2 | 3/2016 | Khitun et al. | |
| 9,390,363 B1 | 7/2016 | Herslow et al. | |
| 9,390,366 B1 | 7/2016 | Herslow et al. | |
| 9,542,635 B2 | 1/2017 | Herslow | |
| 9,569,718 B2 | 2/2017 | Herslow | |
| 9,721,200 B2 * | 8/2017 | Herslow | G06K 19/07722 |
| 2007/0096852 A1 | 5/2007 | Lawrence et al. | |
| 2008/0106469 A1 * | 5/2008 | Kikkawa | H01L 23/48 |
| | | | 343/700 MS |
| 2008/0308641 A1 | 12/2008 | Finn | |
| 2009/0014527 A1 * | 1/2009 | Grasset | G06K 19/07745 |
| | | | 235/492 |
| 2009/0169776 A1 | 7/2009 | Herslow | |
| 2009/0179817 A1 | 7/2009 | Yin | |
| 2010/0224959 A1 * | 9/2010 | Scherabon | G06K 19/07749 |
| | | | 257/532 |
| 2011/0020606 A1 | 1/2011 | Herslow et al. | |
| 2011/0101113 A1 | 5/2011 | Koujima et al. | |
| 2012/0204414 A1 | 8/2012 | Orihara et al. | |
| 2013/0126622 A1 | 5/2013 | Finn | |
| 2014/0224881 A1 * | 8/2014 | Herslow | G06K 19/02 |
| | | | 235/488 |
| 2015/0136856 A1 | 5/2015 | Herslow et al. | |
| 2015/0206047 A1 | 7/2015 | Herslow et al. | |
| 2015/0339564 A1 | 11/2015 | Herslow et al. | |
| 2016/0180212 A1 | 6/2016 | Herslow et al. | |

OTHER PUBLICATIONS

Chinese Office Action for Application No. 201480062629.7, dated Mar. 28, 2018 with translation, 21 pages.

* cited by examiner

CARD WITH METAL LAYER AND AN ANTENNA

CROSS REFERENCE TO RELATED APPLICATIONS

This application is the continuation application of U.S. application Ser. No. 14/543,495 filed Nov. 17, 2014, now U.S. Pat. No. 9,721,200 issued Aug. 1, 2017, which claims priority to U.S. Provisional Application No. 61/962,873 filed Nov. 18, 2013, the contents of each application incorporated by reference herein.

BACKGROUND OF THE INVENTION

This invention relates to smart cards and in particular to multi layered smart cards having a metal foil/film/layer and an antenna structure for receiving or transmitting signals between the smart cards and a card reader.

As shown in FIGS. 1, 2(a), 2(b) and 2C a typical smart card includes an antenna structure coupled (directly or electromagnetically) to a microprocessor or microcomputer (also referred to as a "chip") also located on or within the card. The antenna structure functions to enable contactless communication between a card reader (also referred to as a "transponder" or "transceiver") and the microprocessor. That is: (a) signals emitted by the card reader are electromagnetically coupled via the antenna to the chip which receives and processes the signals; and (b) signals processed and emitted by the chip are electromagnetically transmitted via the antenna to the card reader. In the manufacture of certain smart cards it is highly desirable that a metal foil/film/layer be included among the card layers. However, the metal foil/film/layer presents a problem since it functions to attenuate (absorb) the signals transmitted between the card reader and the chip limiting communication or even making it impossible. As an example, it is a requirement that a card reader should be able to read a smart card located at a given distance from the card reader. Known cards with a metal foil/film/layer could not be read reliably at these established minimum required distances.

To overcome the attenuating effect of the metal foil/film/layer, an insulator layer may be formed between the metal film/foil/layer and the antenna structure. A conventional approach is to make the insulator layer very thick to decrease the attenuating effect of the metal foil/layer. However, this is not acceptable where the permissible thickness of the insulator layer is limited. As is known in the art there are numerous requirements which have to be met in the manufacture of cards. Some go to the structural integrity of the cards (e.g., they should not bend, delaminate) and be capable of use for several years and a large number of user cycles. So, the cards need to be formed using numerous layers with various requirements on the thickness and composition of the layers. Thus, it is not satisfactory to just make the insulator layer arbitrarily very thick since such thick layers interfere with other requirements in the manufacture of smart cards.

The problem of manufacturing a reliable smart card is even greater particularly when the card includes a metal layer which interferes with the transmission/reception of signals between the smart card and a card reader.

Thus, a significant problem faced by Applicants related to selecting the thickness of an insulator layer, extending within a prescribed range, which can provide reliable readings of card data by a card reader located at a prescribed distance and at a prescribed frequency of operation. An associated problem was finding a thickness for the insulator layer which provided improved transmission/reception.

SUMMARY OF THE INVENTION

Applicants invention resides, in part, in the recognition that the combination of an antenna structure and its associated electronics, including an RFID chip, formed on or within a card can be tuned by varying the distance ("d") between the conductive wires forming the antenna structure and a metal film/foil/layer. "Tuning" as used herein includes enhancing the transmission/reception of signals between the card's antenna structure and a card reader (or like device), so that reliable communication can be had between the card and the card reader at predetermined distances and at predetermined frequencies. In accordance with the invention, "tuning" can be achieved by controlling the thickness of an insulating (non-conductive) layer or layers formed between the antenna structure and the metal film/foil/layer.

In fact, Applicants discovered that, in response to certain transmitted card reader signals, the amplitude of the signals received at the card's antenna were greater for some insulator thickness, which may be termed the preferred thickness ("Tp"), than for thicker insulator layers. Varying the thickness of the insulator layer, varies the distance "d" between the antenna structure and the metal layer and controls the capacitance between the antenna structure layer (23) and the metal layer (24). Varying the capacitance can be used to "tune" the structure to improve the read/write distance between a card reader and a card and the performance (reception/transmission) of the inductive coupling system.

The antenna or antennas can be formed on either side of the holographic metal foil/film/layer and the resulting finished card body can, for thin metal film/foil layers, be interrogated by a card reader from either side of the card body.

BRIEF DESCRIPTION OF THE DRAWINGS

In the accompanying drawings, which are not drawn to scale, like reference characters denotes like components.

DETAILED DESCRIPTION

Figure 1:
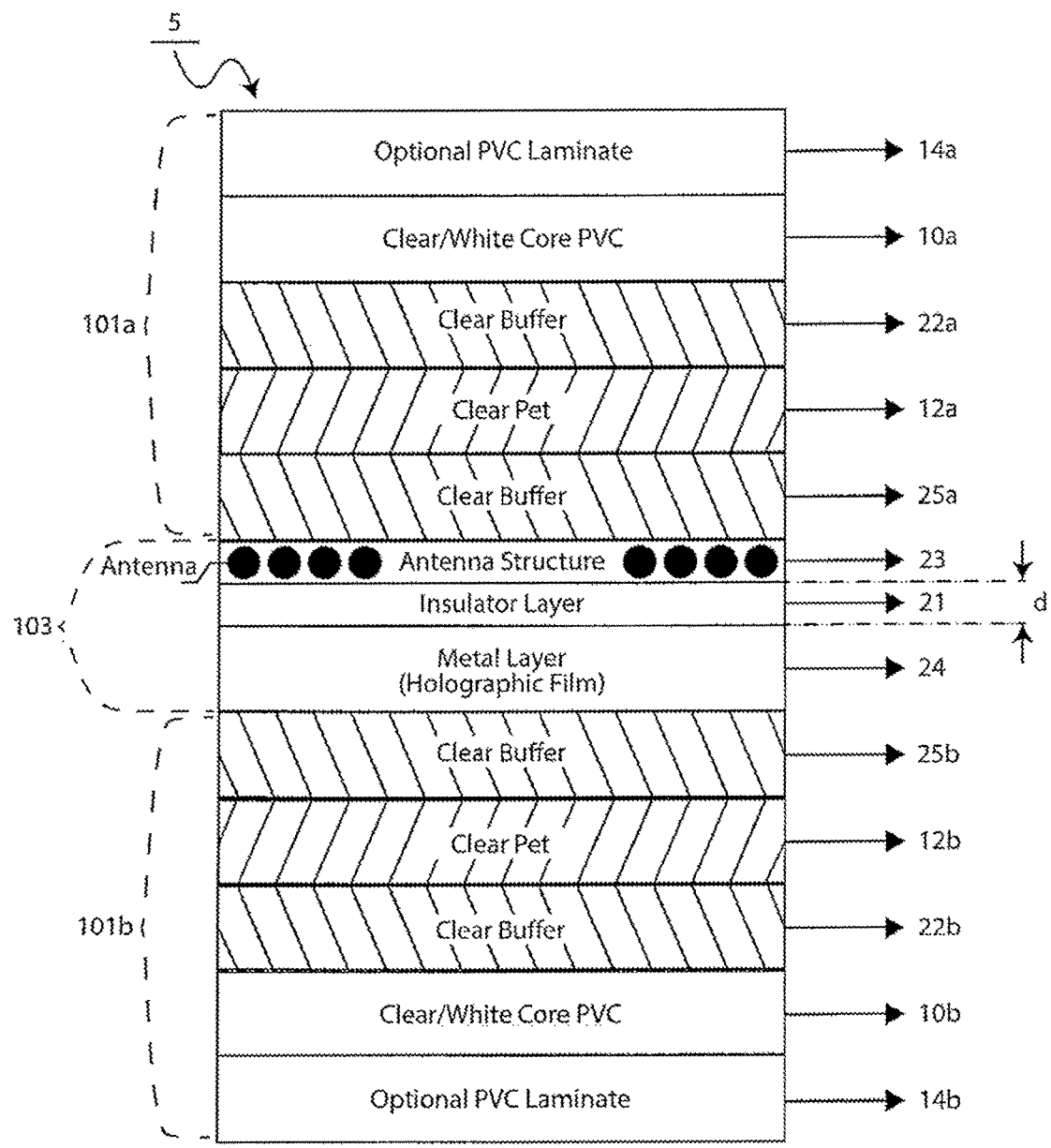
FIG. 1 is a cross sectional diagram illustrating the placement of an antenna structure in close proximity to a metal film located about the center of a card.

Referring to FIGS. 1 through 4 there is shown a generally symmetrical type of card structure illustrating the use of buffer layers in a card construction to absorb the difference between layers having substantially different characteristics which enables many different types of sturdy and secure cards to be manufactured. Card 5 includes (in the Figures) a top section 101a, a correspondingly symmetrically shaped bottom section 101b and a center section 103.

Top section 101a includes a PVC overlay 14a mounted over a core PVC layer 10a, overlying a buffer layer 22a, which, in turn, overlies a PET layer 12a, overlying a buffer layer 25a.

Bottom section 101b includes a PVC overlay 14b formed under a core PVC layer 10b, underlying a buffer layer 22b, which underlies a PET layer 12b, underlying a buffer layer 25b. The buffer layers reduce the stress between the very dissimilar materials enabling a more stable structure having a much greater life time and of greater sturdiness.

The center section 103 of card 5 formed between sections 101a and 101b includes a metal layer 24 separated by an insulator layer 21 from the antenna structure layer 23.

Metal layer 24 may be a holographic film or a metal foil. The metal layer may be used in the card for decorative purposes to give the card a metallic or rainbow coloring which reflects light in desirable ways. Or, to serve any other functional or cosmetic purpose, The metal film/foil layer 24 may be may be metalized or transparent, holographic or plain metalized non-holographic material. The thickness of the metal layer may range from about 1 micron to 200 microns.

The antenna structure layer 23 may include an antenna directly coupled to an RFID chip. Alternatively, it may include a booster antenna inductively coupled to a chip antenna which in turn is directly coupled to an RFID chip 206. The antenna structure 23 may be part of an "RFID inlay" which includes an RFID chip and associated antenna(s) to communicate with a reader or like device. The antenna structure may be formed on or within a suitable plastic layer. The antenna structure 23 and its associated RFID chip 206 (which may be on same layer or on different layers) are intended to communicate wirelessly with a card reader 100. The metal layer 24 interferes with the wireless communication as it attenuates (absorbs) the RF energy transmitted between the card reader and the card.

In cards embodying the invention, the insulator layer 21 is inserted between the antenna structure and the metal layer to counteract the attenuation due to the metal layer. The insulator layer may be formed of any material capable of insulating near field high frequency (HF) signals, but is typically PVC, PET, PETG, PC, latex, cellulose, fiberglass (Teslin), an adhesive and/or composites of these, or other polymers used in card construction. The thickness of the insulator layer 21 may typically range from 10 microns to 350 microns. The maximum thickness of the insulator layer is normally set by constrains pertaining to the various layers used to form the card. Within the permissible, or allowable, range of thicknesses there may be an optimum value of thickness which provides best results, as discussed below, and which, in accordance with invention, may be the selected value of insulator thickness. As discussed below, the thickness of the insulator may be selected to have a value which will optimize (tune) the transmission and reception of signals between a card reader 100 and the antenna structure or chip 206.

Figure 2A:
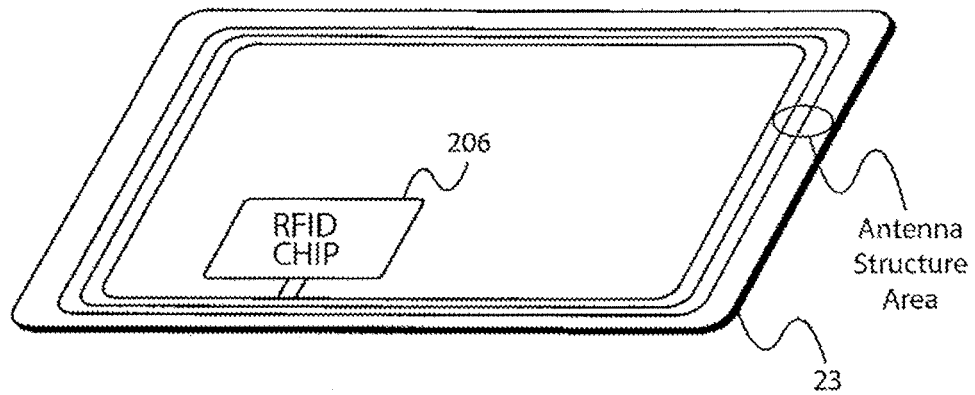
FIG. 2A is a top view of a card layer including an antenna structure and a chip in accordance with one embodiment of the invention.
Figure 2B:
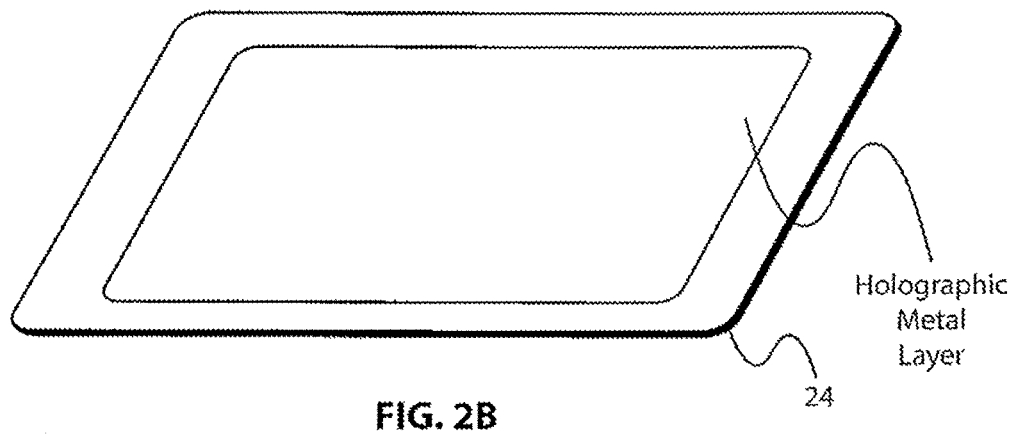
FIG. 2B is a top view of a layer including a metal layer or holographic film structure in accordance with one embodiment of the invention.
Figure 2C:
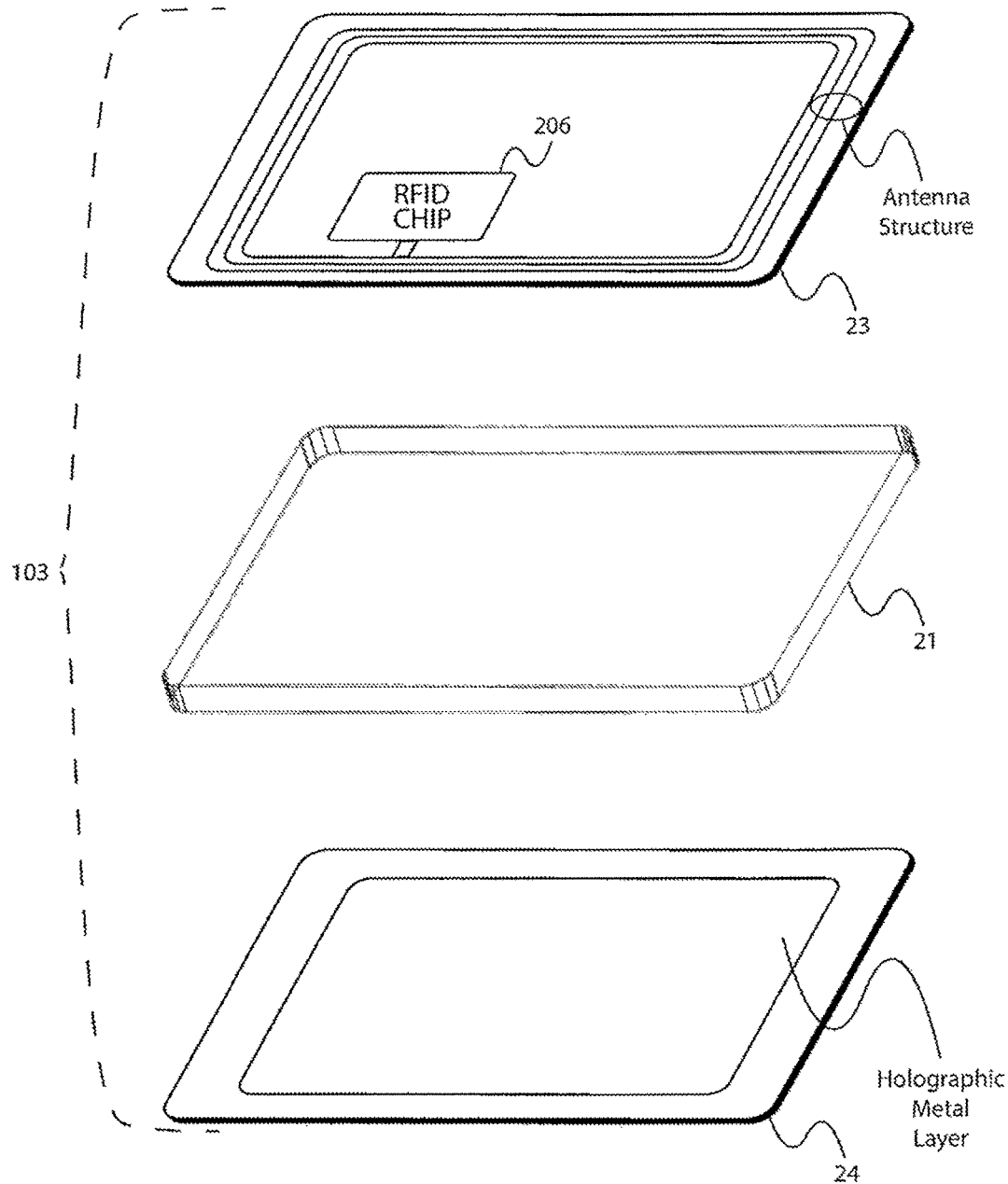
FIG. 2C is an exploded view of an insulator layer formed between an antenna and chip bearing layer (above) and a metal layer (below)

In one embodiment the various layers of the rd of FIG. 4 were approximately as follows:

(i) PVC laminate layers 14a, 14b were 2 mils each,
(ii) The core PVC layers 10a and 10b were 6 mils each,
(iii) The PET layers 12a and 12b were 1 mils each, and
(iv) The buffer layers 22a, 22b, 25a, and 25b were 1 mil each
(v) The antenna structure 23 and RFID chip layer were 2 mils
(vi) The metal layer 24 was 2 mils; and
(vii) The insulator layer was 3 mils. Note that depending upon properties desired and cost constraints polyester layers (the more expensive material) can be placed near both outside surfaces or in the center or unbalanced in the core such that a "bowed" card can be straightened after personalization with a clear lamination. In general, PVC is used to form the outer layer of a card because it enables the personalization of a card to be made more easily. PVC is also normally used because it enables thermal printing or embossing. PVC based materials are normally much cheaper than PET, whereby the greater use of PVC is desirable for economic reasons. Thus, the layers of PVC material are normally thicker (individually and in the aggregate) than the layers of PET and of buffer material Referring to FIGS. 1 through 4 note that a composite card 5 may be formed using numerous layers of different materials which serve various purposes as described below. Pertinent to the present invention is the formation of an inductive coupling antenna structure 23 in close proximity to a holographic metal film/foil layer 24. In FIGS. 1 and 4, the metal film 24 is shown located in or near the center of the card body. However this is by way of illustration only and the antenna structure and metal film could be located near the top or bottom of the card. The antenna structure 23 may be formed above a plastic layer or within a plastic layer. As shown in FIGS. 2A and 2C an RFID chip 206 may be directly connected to the antenna. Alternatively, as shown in FIG. 4, the RFD chip 206 may be located at a different level (layer) than the antenna structure and be inductively (or directly) coupled to the antenna structure. Thus, smart cards embodying the invention include an antenna either directly connected or inductively connected to an RFID chip to provide contactless communication with a card reader 100. The term antenna structure 23 as used herein may refer to the antenna and/or to the antenna and its associated circuitry including the chip.

Figure 4:
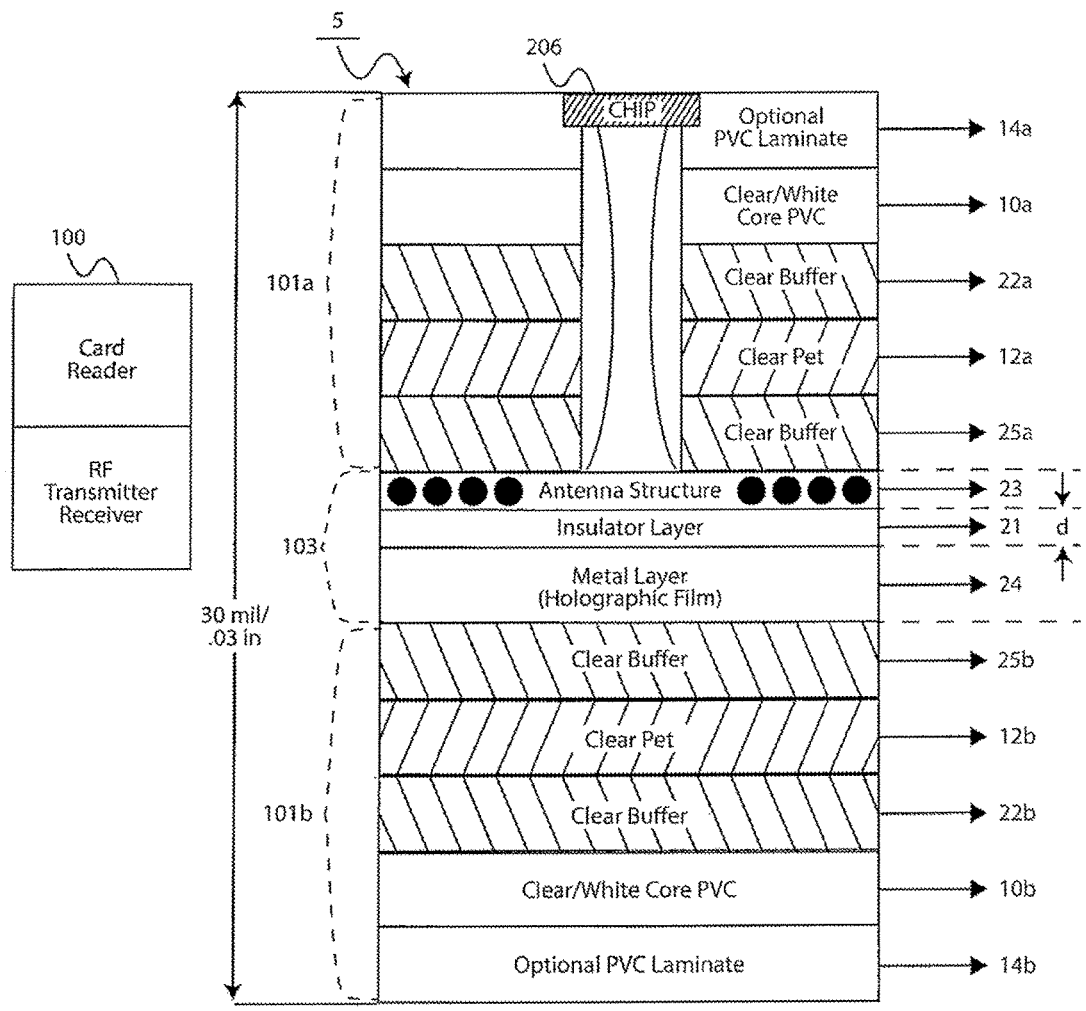
FIG. 4 illustrates the use of an RF transmitter to transmit RF signals to a card structure in accordance with the invention.

As shown in FIG. 4, a card reader or an RF transmitter 100, can send signals to a smart card having an antenna structure 23 separated from a metal layer 24 by an insulator layer 21. The antenna structure 23 is inductively coupled to an RFID chip 206. As is known, a card reader (or transponder) 100 is used to interrogate the card by sending (transmitting) RF signals to the card which are electromagnetically coupled via the antenna structure to the RFID chip 206. In response to the received interrogation signals, the card produces RF signals which are in turn transmitted to the card reader where they are received for processing. As noted above, a problem with having a metal layer 24 is that the metal layer attenuates (absorbs) the electromagnetic energy impeding the transmission/reception of signals between the card and the card reader.

The insulator layer 21 (which may be an adhesive layer or any suitable insulating layer as noted above) is interposed between the antenna structure 23 and metal layer 24. An important aspect of the invention is the selection of the thickness "d" of layer 21.

Applicants recognized that the antenna structure 23 and its associated electronics (e.g. RFID chip 206) can be tuned by varying the distance ("d") between the conductive wires forming the antenna structure and the holographic metal film which was done by controlling the thickness of layer 21. Varying the distance "d" controls the capacitance between the conductive elements in layers 23 and 24. This tuning can be used to improve the read/write distance and performance of the inductive coupling system. Varying the distance "d" can thus be described as seeking and finding a resonant or quasi-resonant frequency range.

Figure 2D:
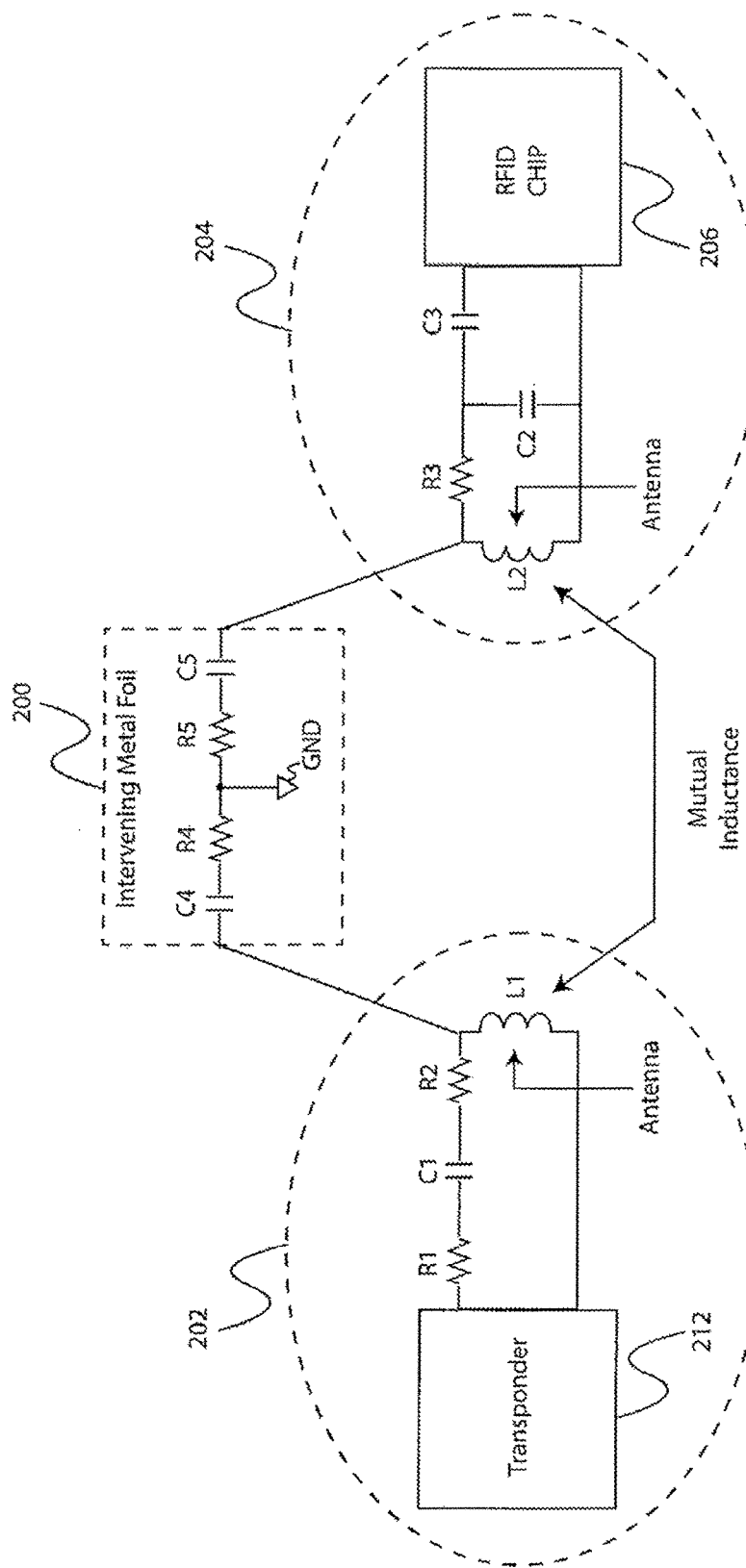
FIG. 2D is a highly simplified equivalent circuit illustrating the function and effect of a metal foil on the transmission/reception of signals between a transponder (RF transmitter/receiver) and an RFID chip.
Figure 3:
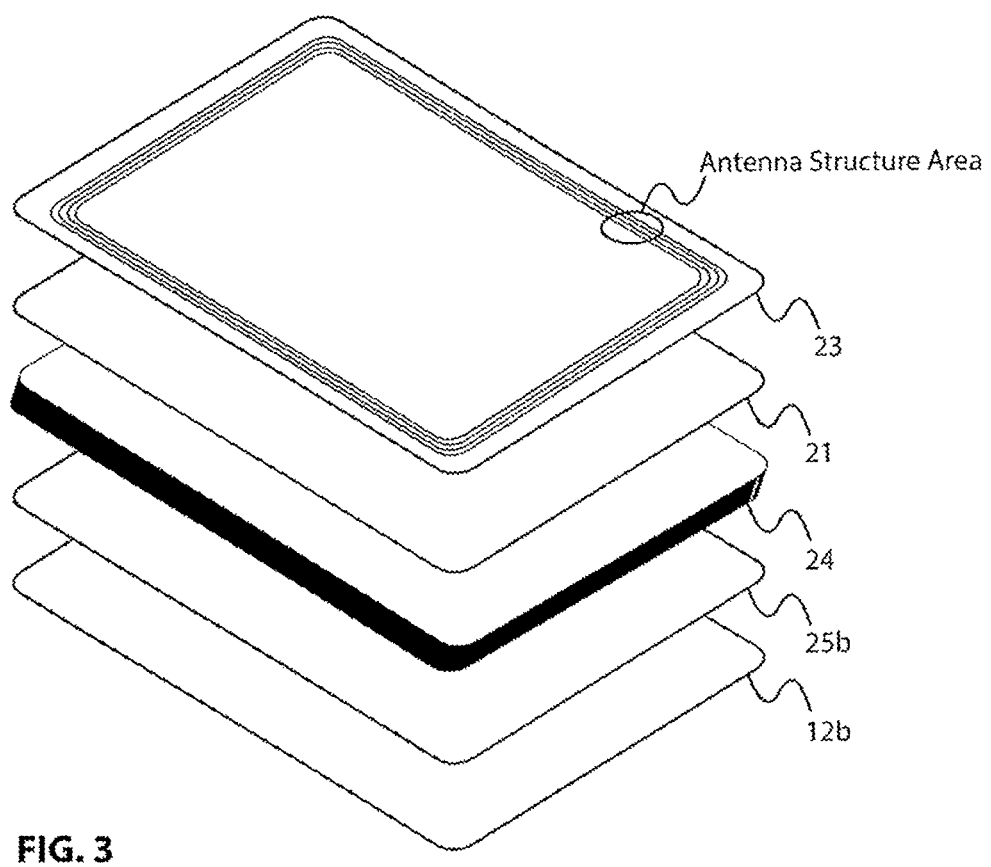
FIG. 3 shows the stacking of some of the layers to form card.

Some insight into the interaction between the metal layer and the insulator layer and their effect on signal transmission/reception may be obtained by reference to FIG. 2D.

FIG. 2D depicts the modelling of the role of the foil and the insulator layer and represents an attempt to illustrate and explain the interactive effect of a metal foil and the role of an insulator layer, formed on a card, on the signal transmission between a card 204 (equivalent to card 5 in FIG. 4) and a card reader 202 (equivalent to card reader 100 in FIG. 4). The metal foil and the insulator layer may be represented by a network 200 which includes capacitors C4 and C5 and resistors R4 and R5. The card reader may be represented by a transponder 212 and associated components R1, C1 and R2 and an antenna coil L1 included in network 202. The card antenna structure and associated electronics may be represented by antenna coil L2 resistor R3 capacitors C2 and C3 and an RFID chip 206 all included in a network 204.

Resistors R4 and R5 change with foil (metal layer) thickness. The thicker the metal the lower the value of resistance. The values of C4 and C5 change as a function of the thickness "d" of the insulator layer between the metal layer and the antenna wires. The smaller (thinner) the insulator thickness the higher is the capacitance of C4 and C5. Note that the one end of resistors R4 and R5 connected in common are shown retuned to ground (GND). This ground (GND) is a "virtual" ground in so far as it represents the grounding effect of the metal foil. That is, the metal foil absorbs the electromagnetic energy but it does not have an electrical path back to the chip or the transponder.

Although FIG. 2D provides insight into the interaction of the metal foil and the insulator layer, it does not enable a user to determine a range of values of C4 and C5 which can optimize transmission/reception at a specified frequency and given metal thickness. It also does not enable a user to derive some form of an approximate equation yielding the resonant frequency.

Figure 5:
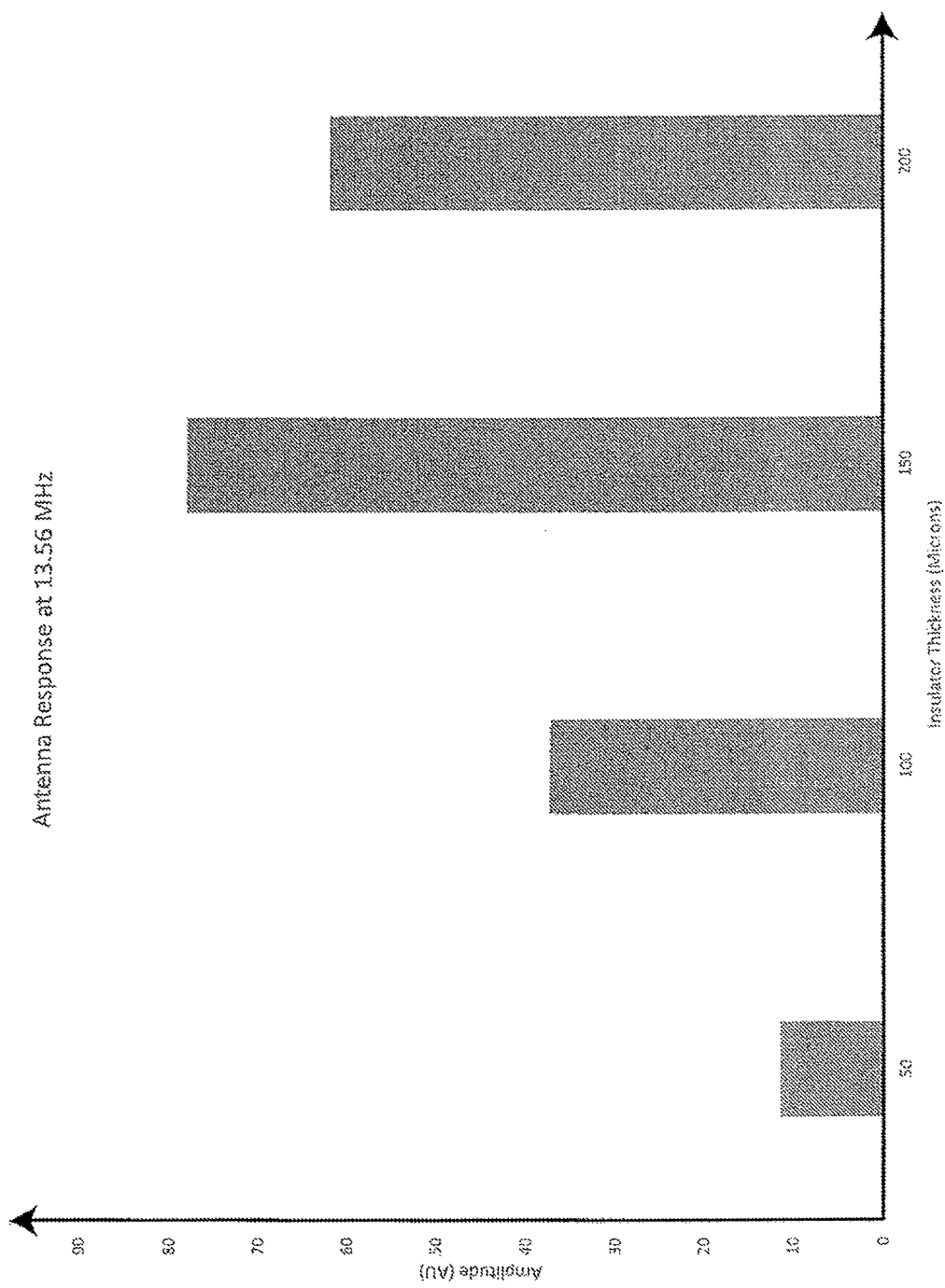
FIG. 5 is a bar graph showing results of measurements of signal amplitude sensed at the antenna of the structure shown in FIGS. 1 and 4.

In accordance with one aspect of the invention, a preferred set of values for the thickness of an insulator layer was determined for a selected structure of the type shown in the figures, as follows. A set of four cards was fabricated which varied only in that the thickness (T) of insulator layer 21 was varied in steps. The antenna layer 23 of the 4 sets of cards was the same and the metal layer of 50 microns was the same for the 4 sets. The insulator layer thickness of the 4 sets was varied to be 50, 100, 150 and 200 microns, respectively. Signals were transmitted from a transponder, such as RF transmitter 100, and the amplitude of the signals received at the antenna structure was then measured for each card. As shown in FIG. 5, for signals emitted by the transponder 100 at a nominal carrier frequency of 13.56 MHz, the measured amplitude of the signals received at the antenna structure had: (a) a relative value of approximately 11 for an insulator thickness of 50 microns; (b) a relative value of approximately 38 for a thickness of 100 microns; (c) a relative value of approximately 80 for an insulator thickness of 150 microns; and (d) a relative value of approximately 62 for a thickness of 200 microns. This demonstrates that, for the particular structure shown in the figures, an insulator thickness in the range of 150 microns provides better reception than a thicker (i.e., 200 micron) insulator layer. This is a significant result demonstrating that testing can reveal a range of values for the thickness of the insulator layer which provide better results than would be expected based on the assumption that the thickest insulator provides the best results for transmission/reception of signals. Thus, as noted above, a quasi-resonant frequency range is located where improved transmission/reception is achieved.

For other card structures, a thickness "d" equal to 54 microns was found to be acceptable.

In accordance with the invention, card structures containing a set antenna structure and a set metal layer (of predetermined thickness) can be tested to ascertain the thickness of a separating insulator which will provide better or best reception between a card reader and the antenna structure.

(a) This can be done on an individual card basis.

(b) This method enables the manufacture of a few cards to determine best operating ranges and then follow through with the manufacture of batches of cards.

(c) The method also enable a user to vary various parameters of the card (e.g., foil thickness and antenna structure) for a given insulator thicknesses and determine reliable operating ranges.

(d) So, as used herein the "selected" or "preferred" insulator thickness (Tp) is defined as the insulator thickness Tp that gives the best (or at least acceptable) reception (at the antenna) to a transmitted signal from a card reader. This value of Tp will also apply for the signals emitted by the card chip via the antenna to the card reader.

(e) Tp may be determined (found) for the frequency (e.g., 13.56 MHz) at which the card reader (or interrogating device) is operating to ensure best responses.

(f) Tp may be determined empirically for a given metal configuration and its thickness and a given antenna structure configuration. At this time no satisfactory equation has been generated which can be used to accurately predict Tp for different configurations.

(g) The value of Tp may be different if the antenna structure changes because the frequency response profile of the antenna will also change. The design of the antenna may have to change due to embossing requirements or other physical attributes of the cards.

(h) The invention may be applicable to all types of metal cards. It is useful with "bulk" metal cards as well when it includes a ferrite layer. So it is relevant to all card constructions.

(i) The invention is useful in making products in that for a given card product there are physical constraints which would dictate the antenna form factor and some of its surrounding layers. Based on those constrains, the insulating layer may be "tuned" as taught herein to maximize the signal response between the card and a card reader.

(j) The invention is particularly useful since it teaches that given the constraints applicable to a card product, the insulator layer an be varied to optimize transmission/reception results. This goes beyond the prior art suggestion of just tuning the antenna.

The invention claimed is:

1. A card comprising:
a singular metal layer;
an antenna structure;
an insulator layer formed between the metal layer and the antenna structure, said insulator layer having first and second surfaces and a thickness, said first surface in direct contact with said antenna structure and said second surface in direct contact with said metal layer, said insulator layer exhibiting a coupling capacitance between said antenna structure and said metal layer, said coupling capacitance having a value that is a function of the thickness of the insulator layer, said metal layer tending to attenuate the amplitude of a radio frequency (RF) signal of a predetermined frequency received at the antenna structure;

wherein the insulator layer thickness is selected to provide a maximum amplitude of the RF signal within a limited range of permissible insulator thicknesses.

2. The card of claim 1, further comprising an RFID chip coupled to the antenna structure.

3. The card of claim 1, wherein said card is configured to transmit and receive signals to and from a card reader located at a predetermined distance from the card.

4. The card as claimed in claim 1, wherein said card includes additional plastic and buffer layers.

5. The card of claim 4, wherein the card comprises a number of plastic layers above the antenna structure and a like number of plastic layers below the metal layer.

6. The card of claim 1, wherein the metal layer comprises a holographic film.

7. The card of claim 1, wherein the metal layer comprises a metal foil.

8. The card of claim 1, wherein the selected insulator thickness is less than a maximum permissible insulator thickness.

9. The card of claim 8, wherein the range of permissible insulator thicknesses comprises a range from 10 microns to 350 microns.

10. A card comprising:
an antenna structure configured to receive a predetermined radio frequency (RF) signal;
an RFID chip coupled to the antenna structure;
a singular metal layer that has a tendency to attenuate amplitude of the RF signal received at the antenna structure; and
an insulator layer in direct contact between the antenna structure and the metal layer, said insulator layer functional to provide capacitance coupling between the antenna structure and the metal layer and having a thickness that affects the value of capacitance between said antenna structure and said metal layer, said insulator layer thickness selected to provide a resonant or quasi-resonant response to the predetermined RF frequency.

11. The card of claim 10, wherein the selected insulator layer thickness is an optimal value that maximizes the RF signal amplitude of the signal received at the antenna structure within a range of permissible insulator thicknesses.

12. The card of claim 11, wherein the optimal value is a function of the antenna structure, thickness of the metal layer, and the predetermined RF frequency.

13. The card of claim 11, wherein the selected insulator thickness is less than a maximum permissible insulator thickness in the range of permissible insulator thicknesses.

14. The card of claim 10, wherein the selected insulator thickness comprises a thickness in a range of 10 microns to 350 microns.

15. The card as claimed in claim 10, wherein said card includes additional plastic and buffer layers.

16. The card of claim 15, wherein the card comprises a number of plastic layers above the antenna structure and a like number of plastic layers below the metal layer.

17. The card of claim 10, wherein the predetermined RF signal has a frequency associated with a card reader for transmitting and receiving signals to and from the card at a predetermined distance from the card.

18. The card of claim 17, wherein the predetermined RF signal has a frequency of 13.56 MHz.

19. The card of claim 10, wherein the insulator layer comprises a material functional to insulate near-field, high frequency (HF) signals.

20. The card of claim 19, wherein the material is selected from the group consisting of: PVC, PET, PETG, PC, latex, cellulose, fiberglass, an adhesive, and composites thereof.

* * * * *